A. & E. STEINHEIL.
PHOTOGRAPHIC CAMERA-LENS.

No. 180,957. Patented Aug. 8, 1876.

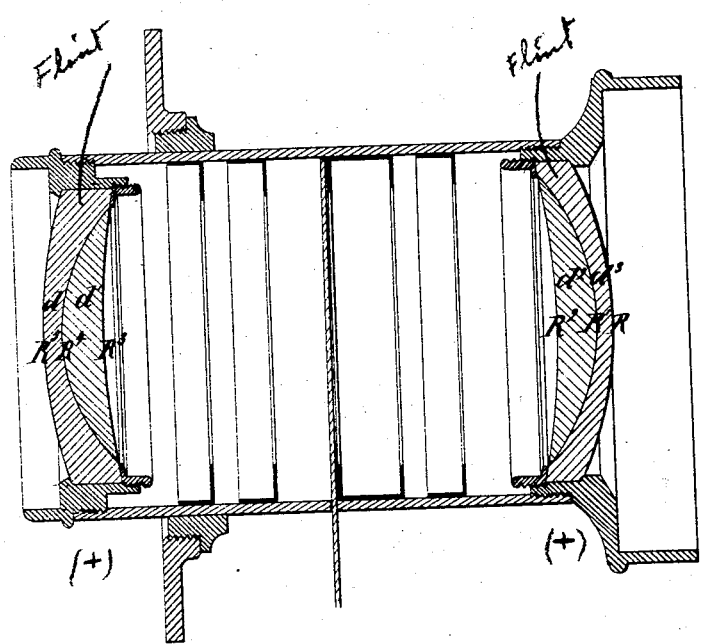

180,957. PHOTOGRAPHIC-CAMERA LENSES. Adolph Steinheil and Edward Steinheil, Munich, Bavaria, Germany. [Filed Feb. 8, 1875.]

The arrangement of two lenses, each of which consists of two parts cemented together, but which are not formed or ground symmetrically, the surfaces $R^2$ and $R^3$ having curves of equal or nearly equal radius, while the curve $R^4$ is of shorter radius than that of R, substantially as shown and described.

Witnesses:
Ernst Bilhuber.
Chas. Wahlers.

Inventors:
Adolph Steinheil
Edward Steinheil
Van Santvoord & Hauff
attys

UNITED STATES PATENT OFFICE.

ADOLPH STEINHEIL AND EDWARD STEINHEIL, OF MUNICH, BAVARIA, GERMANY.

IMPROVEMENT IN PHOTOGRAPHIC-CAMERA LENSES.

Specification forming part of Letters Patent No. 180,957, dated August 8, 1876; application filed February 8, 1875.

*To all whom it may concern:*

Be it known that we, ADOLPH STEINHEIL and EDWARD STEINHEIL, both of Munich, Bavaria, Empire of Germany, have invented a certain new and useful Improvement in Photographical Portrait Apparatuses and other Optical Instruments, of which the following is a specification:

This improvement relates especially to photographic lenses or combinations of lenses used for the purpose of taking portraits, and is also applicable to such lenses or combination of lenses when used for other purposes.

All the best photographic lenses, as heretofore constructed and used, consist of three lenses arranged separately, a method of construction which causes fifteen reflected images—a result most injurious to the photographic image or picture produced, inasmuch as the light becomes considerably troubled or disturbed.

Our invention consists of a novel form and adjustment of the apparatus, by which two lenses only are used, each of which lenses consists of two parts cemented together.

By this method of construction and arrangement greater simplicity is obtained, and only six reflected images are produced, and the resulting photographic image or picture is less injured by the disturbance of the light.

The most essential advantages, however, arising from our novel method of forming and constructing the apparatus consist in the much greater speed with which it operates, as compared with the best and clearest lenses constructed in the methods ordinarily used and practiced, and that it does not admit any distortion of the photographic image, even on its border edges.

Our novel method of forming photographic-portrait lenses is illustrated in the accompanying drawing, which is a longitudinal section of the apparatus $d—d^1$, $d^2$, and $d^3$ being the several parts of the lenses, $d$ and $d^1$ being cemented together to form one lens, and $d^2$ and $d^3$ being cemented together to form the other lens.

The curves of the several glasses which compose the lenses differ from the applanatic lenses for landscapes and groups, as made by us, and in well-known and common use, and also from those well known as Dallmeyer's rectilinear lenses, (which also consist of two pairs of cemented lenses,) in not being ground symmetrically and alike, but dissimilar, and in such manner that while the surfaces $R^2$ and $R^3$ have curves of equal or nearly equal radius, the radius of the surface $R^4$ is shorter than that of $R^1$, and the radius of $R^5$ longer than that of $R$. The first and fourth lenses are made of flint-glass, and the second and third of crown-glass.

The accompanying drawing illustrates the rule for determining the curves of the several lenses, and represents an apparatus of $9''\ 8\frac{1}{4}'''$ (nine inches eight and a quarter lines) real focal length, in which $R=+45'''.8$; $R^1=\pm 28'''.6$; $R^2=-200'''.2$; $R^3=-200'''.2$; $R^4=\pm 23'''.1$; $R^5=+61'''.7$; $d=2'''.75$; $d^1=4'''.84$; $d^2=4'''.84$; $d^3=2'''.75$; $S=60.5$; the indices of refraction of the glass being—

|  | Yellow beam. | Violet beam. |
|---|---|---|
| Crown | 1.51518 | 1.52530 |
| Flint | 1.57402 | 1.59010 |

The particular size and dimensions shown in the drawing are only in illustration of our invention, which may be put in practice on a larger or smaller scale.

By our novel method of forming and arranging the lenses more pure and undistorted images are formed than by any other method, and it is applicable not only to lenses for obtaining photographic portraits, but to lenses used for other optical purposes where bright and undistorted images are required to be produced.

What we claim as new, and desire to secure by Letters Patent, is—

The arrangement of two lenses, each of which consists of two parts cemented together, but which are not formed or ground symmetrically, the surfaces $R^2$ and $R^3$ having curves of equal or nearly equal radius, while the curve $R^4$ is of shorter radius than that of $R$, substantially as shown and described.

In testimony that we claim the foregoing we have hereunto set our hands this 3d day of December, 1874.

ADOLPH STEINHEIL.
EDWARD STEINHEIL.

Witnesses:
G. HENRY HOBSTMANN,
C. LEONPARDZER,
*Gymnasial Professor.*